3,384,614
SYNERGISTIC ANTIOZONANT MIXTURE
Robert H. Rosenwald, Western Springs, Ill., assignor to Universal Oil Products Company, Des Plaines, Ill., a corporation of Delaware
No Drawing. Filed Mar. 25, 1965, Ser. No. 442,785
17 Claims. (Cl. 260—45.9)

ABSTRACT OF THE DISCLOSURE

A synergistic mixture of from about 5% to about 95% by weight of a p-phenylenediamine antiozonant and from about 95% to about 5% by weight of a dicycloalkyldiaminodiphenyl compound such as dicycloalkyldiaminodiphenyl ether, dicycloalkyldiaminodiphenyl sulfide, dicycloalkyldiaminodiphenyl amine or dicycloalkyldiaminodipheny alkane. The synergistic mixture is useful as an antiozonant for natural and synthetic rubber.

---

This invention relates to a novel synergistic antiozonant mixture and to the use of such a mixture to prevent deterioration of rubber caused by ozone.

It is well known that rubber undergoes cracking due to attack by ozone in the atmosphere. In addition, rubber undergoes deterioration caused by oxygen in the atmosphere. It has been well established that the deterioration caused by ozone and the deterioration caused by oxygen are different and that both types of deterioration will occur when both ozone and oxygen are present in the atmosphere.

Various antiozonants are presently being used in rubber to retard cracking due to ozone. While these antiozonants are effective in most rubber formulations, it is desired to even further improve their effectiveness. Furthermore, different rubber formulations respond differently to the response to the antiozonant is not sufficient, it is especially desirable to improve the effectiveness of the antiozonant addition of various antiozonants and, in cases where the in such formulations. The novel synergistic mixture of the present invention serves to prevent cracking of rubber due to ozone to a greater extent than the sum of the benefits obtained through the use of either of the components of the mixture separately. In addition, the synergistic mixture also serves to retard deterioration of the rubber due to oxidation.

Preferred antiozonants for rubber comprise p-phenylenediamines. A particularly preferred antizonant comprises an N,N'-di-sec-alkyl-p-phenylenediamine in which the alkyl group contains at least 8 carbon atoms. Particularly effective antiozonants comprise N,N'-di-sec-octyl-p-phenylenediamine and N,N'-di-sec-nonyl-p-phenylenediamine. The preferred antiozonants contain from 8 to 12 carbon atoms in each alkyl group and thus also include N,N'-di-sec-decyl-p-phenylenediamine, N,N'-di-sec-undecyl-p-phenylenediamine and N,N₂-di-sec-dodecyl-p-phenylenediamine. In another embodiment the preferred antiozonant contains from 3 to 7 carbon atoms in each alkyl group and includes N,N'-diisopropyl-p-phenylenediamine, N,N'-di-sec-butyl-p-phenylenediamine, N,N'-di-sec-pentyl-p-phenylenediamine, N,N'-di-sec-hexyl-p-phenylenediamine and N,N'-di-sec-heptyl-p-phenylenediamine. In some cases the alkyl groups each may contain up to 20 carbon atoms or more and thus will include N,N'-di-sec-tridecyl-p-phenylenediamine,
N,N'-di-sec-tetradecyl-p-phenylenediamine,
N,N'-di-sec-pentadecyl-p-phenylenediamine,
N,N'-di-sec-hexadecyl-p-phenylenediamine,
N,N'-di-sec-heptadecyl-p-phenylenediamine,
N,N'-di-sec-octadecyl-p-phenylenediamine,
N,N'-di-sec-nonadecyl-p-phenylenediamine,
N,N'-di-sec-eicosyl-p-phenylenediamine, etc.

While these antizonants are extremely effective, it is of course desirable to further increase their effectiveness.

Other phenylenediamine antiozonants includes N,N'-dicycloalkyl-p-phenylenediamine and particularly N,N'-dicyclohexyl-p-phenylenediamine. Still other phenylenediamine antiozonants comprise N - alkyl - N' - phenyl-p-phenylenediamines including N-isopropyl-N'-phenyl-p-phenylenediamine,
N-sec-butyl-N'-phenyl-p-phenylenediamine,
N-sec-pentyl-N'-phenyl-p-phenylenediamine,
N-sec-hexyl-N'-phenyl-p-phenylenediamine,
N-sec-heptyl-N'phenyl-p-phenylenediamine,
N-sec-octyl-N'-phenyl-p-phenylenediamine,
N-sec-nonyl-N'-phenyl-p-phenylenediamine,
N-sec-decyl-N'-phenyl-p-phenylenediamine,
N-sec-undecyl-N'-phenyl-p-phenylenediamine,
N-sec-dodecyl-N'-phenyl-p-phenylenediamine, etc.

Still another antitozonant comprises N,N'-diphenyl-p-phenylenediamine.

Surprisingly, it has been found that certain compounds which possess antioxidant properties also produce a synergistic effect when used in combination with the antiozonants hereinbefore set forth. As will be shown by the examples appended to the present specifications, these additional compounds in themselves do not possess antiozonant properties. Therefore, it is surprising that they should increase the antiozonant properties of the antiozonants hereinbefore set forth.

These additional compounds are antioxidants and therefore will contribute antioxidant properties to the rubber, in addition to their synergistic effect in enhancing the antiozonant properties of the p-phenylenediamine compounds hereinbefore set forth.

The compounds contributing to the synergistic effect are dicycloalkyldiaminodiphenyl ethers, sulfides, amines and alkanes. In a preferred embodiment the cycloalkylamino substituents are in the 4,4'-positions. In another embodiment the cycloalkyl substituents are in the 2,4'-positions. In still another embodiment, mixtures in which the cycloalkyl substituents are in the 4,4'- and 2,4'-positions may be employed.

The 4,4'-dicycloalkyldiaminodiphenyl compounds are illustrated by the following general formula:

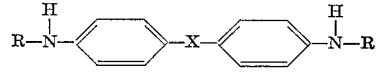

where R is cycloalkyl and X is oxygen, sulfur, nitrogen or alkane.

Of the dicycloalkyldiaminodiphenyl ethers, a particularly preferred compound is 4,4'-dicyclohexyldiaminodiphenyl ether. As hereinbefore set forth, in another embodiment the compound is 2,4'-dicyclohexyldiaminodiphenyl ether and, in still another embodiment, a mixture of 4,4'- and 2,4'-dicyclohexyldiaminodiphenyl ethers may be employed. Other dicycloalkyldiaminodiphenyl ethers include dicyclopentyldiaminodiphenyl ether, dicycloheptyldiaminodiphenyl ether, dicyclooctyldiaminodiphenyl ether, dicyclononyldiaminodiphenyl ether, dicyclodecyldiaminodiphenyl ether, dicycloundecyldiaminodiphenyl ether, dicyclododecyldiaminodiphenyl ether, etc., in which the cycloalkyl groups preferably are in the 4,4- and/or 2,4'-positions.

A preferred dicycloalkyldiaminodiphenyl sulfide is 4,4'-dicyclohexyldiaminodiphenyl sulfide. In another embodiment 2,4'-dicyclohexyldiaminodiphenyl sulfide and/or mixtures thereof with 4,4'-dicyclohexyldiaminodiphenyl sulfide may be employed. Other compounds in this embodiment include dicyclopentyldiaminodiphenyl sulfide, dicycloheptyldiaminodiphenyl sulfide, dicyclooctyldiaminodiphenyl sulfide, dicyclononyldiaminodiphenyl sulfide, dicyclodecyldiaminodiphenyl sulfide, dicycloundecyldiaminodiphenyl sulfide, dicyclododecyldiaminodiphenyl sulfide, etc., in which the cycloalkyl groups preferably are in the 4,4'- and/or 2,4'-positions.

A preferred dicycloalkyldiaminodiphenyl amine is 4,4'-dicyclohexyldiaminodiphenyl amine. In another embodiment 2,4'-dicyclohexyldiaminodiphenyl amine and/or mixtures thereof with 4,4'-dicyclohexyldiaminodiphenyl amine may be employed. Other compounds in this embodiment include dicyclopentyldiaminodiphenyl amine, dicycloheptyldiaminodiphenyl amine, dicyclooctyldiaminodiphenyl amine, dicyclononyldiaminodiphenyl amine, dicyclodecyldiaminodiphenyl amine, dicycloundecyldiaminodiphenyl amine, dicyclododecyldiaminodiphenyl amine, etc., in which the cycloalkyl groups preferably are in the 4,4'- and/or 2,4'-positions.

A preferred dicycloalkyldiaminodiphenyl alkane is 4,4-dicyclohexyldiaminodiphenyl methane. In another embodiment the corresponding 2,4'-dicyclohexyldiaminodiphenyl methane and/or mixtures thereof with 4,4'-dicyclohexyldiaminodiphenyl methane may be employed. Other compounds in this embodiment include dicyclopentyldiaminodiphenyl methane, dicycloheptyldiaminophenyl methane, dicyclooctyldiaminodiphenyl methane, dicyclononyldiaminodiphenyl methane, dicyclodecyldiaminodiphenyl methane, dicycloundecyldiaminodiphenyl methane, dicycloddodecyldiaminodiphenyl methane, etc., in which the cycloalkyl groups preferably are in the 4,4'- and/or 2,4'-positions.

Another preferred dicycloalkyldiaminodiphenyl alkane is 4,4'-dicyclohexyldiaminodiphenyl propane. Other compounds in this embodiment include dicyclopentyldiaminodiphenyl propane, dicycloheptyldiaminodiphenyl propane, dicyclooctyldiaminodiphenyl propane, dicyclononyldiaminodiphenyl propane, dicyclodecyldiaminodiphenyl propane, dicycloundecyldiaminodiphenyl propane, dicyclododecyldiaminodiphenyl propane, etc., in which the cycloalkyl groups preferably are in the 4,4'- and/or 2,4'-positions. It is understood that the dicycloalkyldiaminodiphenyl substituents may be attached to the propane moiety in the 1,1-, 1,2- and/or 1,3-positions.

In still another embodiment the dicycloalkyldiaminodiphenyl alkane comprises the 4,4'- and/or 2,4'-dicycloalkydiaminodiphenyl ethanes, butanes, pentanes, hexanes, heptanes, octanes, etc., in which the cycloalkyl groups preferably are cyclohexyl. In another embodiment the cycloalkyl groups will be selected from the other cycloalkyl substituents hereinbefore set forth. It is understood that the alkane moiety may be straight or branched chain.

It is understood that one or both of the phenyl rings may contain other substituents attached thereto and that one or both of the cycloalkyl rings may contain substituents attached thereto. The substituents preferably are hydrocarbyl and selected from alkyl, cycloalkyl, aryl, aralkyl, alkaryl, etc. However, these different compounds are not necessarily equivalent in their synergistic effect, but all of them will serve to enhance the antiozonant properties of the antiozonants hereinbefore set forth.

In another embodiment the present invention relates to a method of stabilizing rubber against cracking due to ozone which comprises incorporating therein an antiozonant mixture of a phenylenediamine antiozonant and the dicyclohexyldiaminodiphenyl compound in synergistic proportions.

As hereinbefore set forth, the components are used in synergistic proportions. In one embodiment these may comprise from about 5% to about 95% of one component and from about 95% to about 5% of the other component. In most cases it is preferred to utilize these compounds in concentrations of from about 25% to about 75% of one component and from about 75% to about 25% of the other component. In a particularly preferred embodiment, the p-phenylenediamine antiozonant comprises from about 50% to about 90% and the dicycloalkyldiaminodiphenyl compound comprises from about 50% to about 10% by weight of the synergistic mixture.

The synergistic composition of the present invention is used in rubber in a concentration sufficient to effect the desired stabilization. The concentration may range from about 0.5% to about 5% and more particularly from about 1.5% to about 3% by weight of the rubber, although, in some cases higher or lower concentrations may be employed. These concentrations are based on the rubber hydrocarbon exclusive of the other components of the rubber composition and are used in this manner in the present specifications and claims. When desired, the synergistic mixture is used along with an additional antioxidant and also is used along with other additives incorporated in rubber for specific purposes including accelerators, softeners, extends, wax, reinforcing agents, etc.

When used along with an additional antioxidant, it is understood that any suitable antioxidant may be employed including, for example, phenyl-beta-naphthylamine, 6-phenyl-2,2,4-trimethyl - 1,2 - dihydroquinoline, marketed under the trade name of "Santoflex–B," 2,2'-methylene-bis-(4-methyl-6-tert-butyl-phenol), 2,6-di - tert - butyl - p-cresol, the reaction product of acetone and diphenylamine, marketed under the trade name of "B.L.E.," etc. These additional antioxidants generally are used in a concentration of from about 0.5% to about 3% by weight of the rubber.

When desired, the synergistic mixture of the present invention also is used along with paraffin and/or microcrystalline wax. The wax generally is utilized in a concentration of from 0.5% to 3% by weight of the rubber.

In one embodiment the synergistic mixture of the present invention is admixed with the wax, and/or other additives, and the mixture then is composited with one or more of the other components of the rubber composition. In a preferred embodiment the synergistic mixture is incorporated in the latex prior to milling. In still another embodiment vulcanized rubber may be soaked, dipped or suspended in the synergistic mixture to apply a surface coating to the rubber, or the synergistic mixture may be sprayed, poured or otherwise contacted with the previously vulcanized rubber.

The synergistic mixture of the present invention is utilized in any rubber composition subject to ozone cracking, including those used for automobile and truck tires and tubes, hose, belting, sheet and tread rubber, rubberized fabrics, molded goods, boots and shoes, etc., whether vulcanized in a mold, in open steam, in hot air, or in the cold by the so-called acid process. In another embodiment, the present invention can be utilized for the stabilization of adhesives, elastomers, etc., which tend to crack due to ozone.

When the synergistic mixture is added to a liquid such as rubber pigment or an oil, it is dissolved therein in the desired proportions. When the synergistic mixture is added to a solid substrate, it is incorporated therein by milling, mastication, etc. The synergistic mixture may be utilized as such or as a solution or dispersion or as a powder, paste, etc.

In general, rubber is classified as a vulcanizable diene hydrocarbon rubber and comprises polymers of conjugated 1,3-dienes either as polymers thereof or as copolymers thereof with other polymerizable compounds. In one embodiment the rubber is a synthetic rubber including, for example, butadiene-styrene copolymer rubber presently referred to in the art as SBR rubber, Buna-N rubber produced from butadiene and acrylonitrile, Butyl rubber produced from butadiene and isobutylene, Neoprene, etc. The natural rubbers include Hevea rubber, Caoutchouc, Balata, Gutta Percha, etc. It is understood that the term rubber as used in the present specification and claims is intended to include both synthetic rubber and natural rubber which undergo cracking due to ozone.

The following examples are introduced to illustrate further the novelty and utility of the present invention but not with the intention of unduly limiting the same.

Example I

The base rubber used in this and some of the following examples has the following recipe:

TABLE I

| Ingredient: | Parts by weight |
|---|---|
| SBR–1502 | 100 |
| Furnace black | 40 |
| Zinc oxide | 3 |
| Stearic acid | 2 |
| Sulfur | 2 |
| Accelerator [1] | 1.25 |

[1] N-cyclohexyl-2-benzothiazole-sulfenamide.

A sample of rubber of the above of the above recipe was used as the blank or control sample. Various combinations of additives were incorporated into other samples of the rubber during milling, as will be specifically identified below. All of the samples were formed into strips 6″ long by 1″ wide and then cured individually for 40 minutes at 284° F. The different samples were elongated 10% and evaluated in an ozone cabinet at 100° F. in an atmosphere containing 50 parts of ozone per 100,000,000 parts of air. The time to first visible crack was determined and is reported in the following examples.

The antiozonant used in this example was N,N′-di-2-octyl-p-phenylenediamine. The synergistic compound was 4,4′-dicyclohexyldiaminodiphenyl ether. In order to make a direct comparison, the antiozonant and the synergistic compound each were separately evaluated in a concentration of 2% by weight, and the mixture of these for evaluation contained 2% by weight of each of the components. The results of these evaluations are shown in the following table.

TABLE II

| Run No. | Additive | Concentration (Parts by Weight) | Hours to First Crack |
|---|---|---|---|
| 1 | None | | 0–2 |
| 2 | N,N′-di-2-octyl-p-phenylenediamine. | 2 | 24–32 |
| 3 | 4,4′-dicyclohexyl-diaminodiphenyl ether. | 2 | 0–2 |
| 4 | N,N′-di-2-octyl-p-phenylenediamine plus 4,4′-dicyclohexyl-diaminodiphenyl ether. | 2<br>2 | >168 |

From the data in the above table it will be seen that the control sample of rubber (Run No. 1) underwent cracking within two hours in the ozone cabinet. The sample of rubber containing N,N′-di-2-octyl-p-phenylenediamine (Run No. 2) was somewhat improved. In Run No. 3, it is demonstrated that the dicyclohexyldiaminodiphenyl ether by itself is of no benefit whatsoever as an antiozonant. Surprisingly then, as shown in Run No. 4, the mixture of both the antiozonant and the dicyclohexyldiaminodiphenyl ether resulted in preventing cracking to more than 168 hours of exposure in the ozone cabinet.

Example II

Another series of runs similar to those described in Example I was made except that the dicyclohexyldiaminodiphenyl compound was 4,4′-dicyclohexyldiaminodiphenyl methane. The results of these runs are reported in the following table which, for the sake of completeness, also repeats Runs 1 and 2.

TABLE III

| Run No. | Additive | Concentration (Parts by Weight) | Hours to First Crack |
|---|---|---|---|
| 1 | None | | 0–2 |
| 2 | N,N′-di-2-octyl-p-phenylenediamine. | 2 | 24–32 |
| 5 | 4,4′-dicyclohexyl-diaminodiphenyl methane. | 2 | 0–2 |
| 6 | N,N′-di-2-octyl-p-phenylenediamine plus 4,4′-dicyclohexyl-diaminodiphenyl methane. | 2<br>2 | >168 |

Here again it will be seen that the dicyclohexyldiaminodiphenyl compound when used alone was ineffective as an antiozonant. In contrast, the mixture thereof with the antiozonant increased the stability of the rubber to greater than 168 hours.

Example III

Another series of runs similar to those described in Examples I and II were made except that the dicyclohexyldiaminodiphenyl compound was 4,4′-dicyclohexyldiaminodiphenyl propane. The results of these runs are reported in the following table which, for the sake of completeness, repeats Runs 1 and 2.

TABLE IV

| Run No. | Additive | Concentration (Parts by Weight) | Hours to First Crack |
|---|---|---|---|
| 1 | None | | 0–2 |
| 2 | N,N′-di-2-octyl-p-phenylenediamine. | 2 | 24–32 |
| 7 | 4,4′-dicyclohexyl-diaminodiphenyl propane. | 2 | 0–2 |
| 8 | N,N′-di-2-octyl-p-phenylenediamine plus 4,4′-dicyclohexyl-diaminodiphenyl propane. | 2<br>2 | >168 |

Here again it will be noted that the mixture of the N,N′-di-2-octyl-p-phenylenediamine antiozonant and the 4,4′-dicyclohexyldiaminodiphenyl propane extended the time to first crack to greater than 168 hours. As heretofore set forth, this is surprising because the dicyclohexyldiaminodiphenyl propane by itself was of no benefit whatsoever in improving the antiozonant properties of the rubber.

Example IV

The synergistic mixture for use in this example comprises 75% by weight of N,N′-di-3-(5-methylheptyl)-p-phenylenediamine and 25% by weight of 2,4′-dicyclohexyldiaminodiphenyl sulfide. The synergistic mixture is milled into the rubber samples in the manner described in Example I and the samples are evaluated in an ozone cabinet containing an atmosphere of 50 parts of ozone per 100,000,000 parts of air. When evaluated in this manner, it will be found that the time to first crack of the rubber sample containing the synergistic mixture is extended more than five times that obtained when using the antiozonant alone. Here again, it will be found that 2,4′-dicyclohexyldiaminodiphenyl sulfide is not effective as an antiozonant.

Example V

The synergistic mixture of this example comprises 60% by weight of N-phenyl-N′-isopropyl-p-phenylenediamine and 40% by weight of 4,4′-dicyclohexyldiaminodiphenyl amine. The synergistic mixture is incorporated in a concentration of 4% by weight into a natural rubber recipe and serves to retard cracking of the rubber due to ozone.

I claim as my invention:
1. A synergistic mixture of from about 5% to about 95% by weight of a p-phenylenediamine antiozonant selected from the groups consisting of N,N′-di-sec-alkyl-p-phenylene diamine and N-sec-alkyl, N′-phenyl-p-phenylene diamine in which each of the alkyl groups contains from 3 to 20 carbon atoms and from about 95% to about 5% by weight of a dicycloalkyldiaminodiphenyl com- pound selected from the group consisting of dicycloalkyl-diaminodiphenyl ether and dicycloalkyldiaminodiphenyl lower alkane, each cycloalkyl group of said dicycloalkyl-diaminodiphenyl compound having from 5 to about 12 carbon atoms in the ring.

2. A synergistic mixture of from about 50% to about 90% by weight of N,N'-di-sec-alkyl-p-phenylenediamine in which each of the alkyl groups contains from 3 to about 20 carbon atoms and from about 50% to about 10% by weight of dicycloalkyldiaminodiphenyl lower alkane in which each of the cycloalkyl groups contains from about 5 to about 12 carbon atoms in the ring.

3. A synergistic mixture of from about 50% to about 90% by weight of N,N'-di-sec-alkyl-p-phenylenediamine in which each of the alkyl groups contains from about 3 to about 20 carbon atoms and from about 50% to about 10% by weight of dicyclohexyldiaminodiphenyl lower alkane.

4. A synergistic mixture of from about 50% to about 90% by weight of N-sec-alkyl-N'-phenyl-p-phenylenediamine in which said alkyl contains from about 3 to about 12 carbon atoms and from about 50% to about 10% by weight of dicycloalkyldiaminodiphenyl lower alkane in which each of the cycloalkyl groups contains from about 5 to about 12 carbon atoms in the ring.

5. A synergistic mixture of from about 50% to about 90% by weight of N,N'-di-sec-alkyl-p-phenylenediamine in which each of the alkyl groups contains from 3 to about 20 carbon atoms and from about 50% to about 10% by weight of dicyclohexyldiaminodiphenyl ether.

6. A synergistic mixture of from about 50% to about 90% by weight of N,N'-di-sec-alkyl-p-phenylenediamine in which each of the alkyl groups contains from 3 to about 20 carbon atoms and from about 50% to about 10% by weight of dicyclohexyldiaminodiphenyl methane.

7. A synergistic mixture of from about 50% to about 90% by weight of N,N'-di-sec-alkyl-p-phenylenediamine in which each of the alkyl groups contains from 3 to about 20 carbon atoms and from about 50% to about 10% by weight of dicyclohexyldiaminodiphenyl propane.

8. A synergistic mixture of from about 50% to about 90% by weight of N-sec-alkyl-N'-phenyl-p-phenylenediamine in which said alkyl contains from 3 to about 12 carbon atoms and from about 50% to about 10% by weight of dicyclohexyldiaminodiphenyl ether.

9. A synergistic mixture of from about 50% to about 90% by weight of N-sec-alkyl-N'-phenyl-p-phenylenediamine in which said alkyl contains from 3 to about 12 carbon atoms and from about 50% to about 10% by weight of dicyclohexyldiaminodiphenyl lower alkane.

10. Vulcanizable diene hydrocarbon rubber normally subject to cracking due to ozone containing a stabilizing concentration of a synergistic mixture as defined in claim 1.

11. Butadiene-styrene rubber normally subject to cracking due to ozone containing a stabilizing concentration of a synergistic mixture as defined in claim 5.

12. Butadine-styrene rubber normally subject to cracking due to ozone containing a stabilizing concentration of a synergistic mixture as defined in claim 6.

13. Butadiene-styrene rubber normally subject to cracking due to ozone containing a stabilizing concentration of a synergistic mixture as defined in claim 7.

14. Butadiene-styrene rubber normally subject to cracking due to ozone containing a stabilizing concentration of a synergistic mixture as defined in claim 8.

15. Natural rubber normally subject to cracking due to ozone containing a stabilizing concentration of a synergistic mixture as defined in claim 1.

16. Vulcanizable diene rubber normally subject to cracking due to ozone containing a stabilizing concentration of a synergistic mixture as defined in claim 2.

17. Vulcanizable diene rubber normally subject to cracking due to ozone containing a stabilizing concentration of a synergistic mixture as defined in claim 4.

References Cited

UNITED STATES PATENTS

| | | | |
|---|---|---|---|
| 3,126,412 | 3/1964 | Stahly | 260—45.9 |
| 3,202,630 | 8/1965 | Sullivan | 260—45.9 |
| 3,224,972 | 12/1965 | Orloff | 260—45.9 |
| 3,265,736 | 8/1966 | Wheeler | 260—45.9 |
| 3,288,749 | 11/1966 | Cox | 260—45.9 |
| 3,293,321 | 12/1966 | Layer | 260—45.9 |
| 3,297,628 | 1/1967 | Cyba | 260—45.9 |

DONALD E. CZAJA, *Primary Examiner.*

H. E. TAYLOR, Jr., *Examiner.*